United States Patent [19]

Mann et al.

[11] Patent Number: 4,589,297
[45] Date of Patent: May 20, 1986

[54] ADJUSTING TRANSMISSION IN A MOTOR VEHICLE

[75] Inventors: Bernd Mann, Pfarrweisach/Römmelsdorf; Gerhard Schneyer, Grosswalbur; Emil Dinkel, Coburg, all of Fed. Rep. of Germany

[73] Assignee: Brose Fahrzeugteile GmbH & Co. KG, Fed. Rep. of Germany

[21] Appl. No.: 619,932

[22] Filed: Jun. 12, 1984

[30] Foreign Application Priority Data

Jun. 24, 1983 [DE] Fed. Rep. of Germany ....... 3322863

[51] Int. Cl.$^4$ ............ F16H 1/16; F16C 7/00; F16C 11/00; F16C 27/00
[52] U.S. Cl. ............................ 74/427; 384/154; 384/192; 384/196; 384/200; 384/199; 384/219
[58] Field of Search .......... 74/427, 425, 411, 410; 297/362; 384/108, 154, 192, 196, 200, 199, 219

[56] References Cited

U.S. PATENT DOCUMENTS

| 1,063,616 | 6/1913 | Stephens | 384/192 |
|---|---|---|---|
| 1,188,518 | 6/1916 | Wilford | 384/200 |
| 1,352,204 | 9/1920 | Leitch | 384/200 |
| 2,094,058 | 9/1937 | Bryson | 384/196 |
| 3,400,603 | 9/1968 | Stafford | 74/411 |
| 3,511,920 | 5/1970 | Hertfelder | 74/425 |
| 3,705,751 | 12/1972 | Dee | 384/108 |
| 3,735,645 | 5/1973 | Pickles | 74/425 |
| 3,848,477 | 11/1974 | Giandinoto et al. | 74/425 |
| 4,183,590 | 1/1980 | Lower | 308/72 |
| 4,367,660 | 1/1983 | Becker et al. | 74/411 X |
| 4,368,931 | 1/1983 | Casler et al. | 384/192 |
| 4,369,387 | 1/1983 | Haar et al. | 74/427 X |
| 4,431,317 | 2/1984 | Gradler et al. | 384/192 |
| 4,482,211 | 11/1984 | Fisher | 74/411 X |

FOREIGN PATENT DOCUMENTS 2912713 2/1980 Fed. Rep. of Germany .
2903782 8/1980 Fed. Rep. of Germany .

Primary Examiner—Lawrence J. Staab
Assistant Examiner—Michael D. Bednarek
Attorney, Agent, or Firm—Craig & Burns

[57] ABSTRACT

An adjusting transmission of a motor vehicle for a motorized seat adjustment with a transmission housing and a worm arranged on a bearing shaft which is supported at the transmission housing in two shaft bearing parts retaining the shaft and inserted into a respective housing aperture on both sides of the worm; at least one of the two shaft bearing parts is thereby tiltably supported within the coordinated housing aperture in at least a plane containing the bearing shaft axis. A self-alignment of the two bearing parts is achieved thereby so that one obtains without large expenditures a transmission operation which is low in friction and freely movable. The bearing part can be constructed as ring with spherical surface which abuts at prism surfaces of the housing aperture as well as of a pressure member.

29 Claims, 10 Drawing Figures

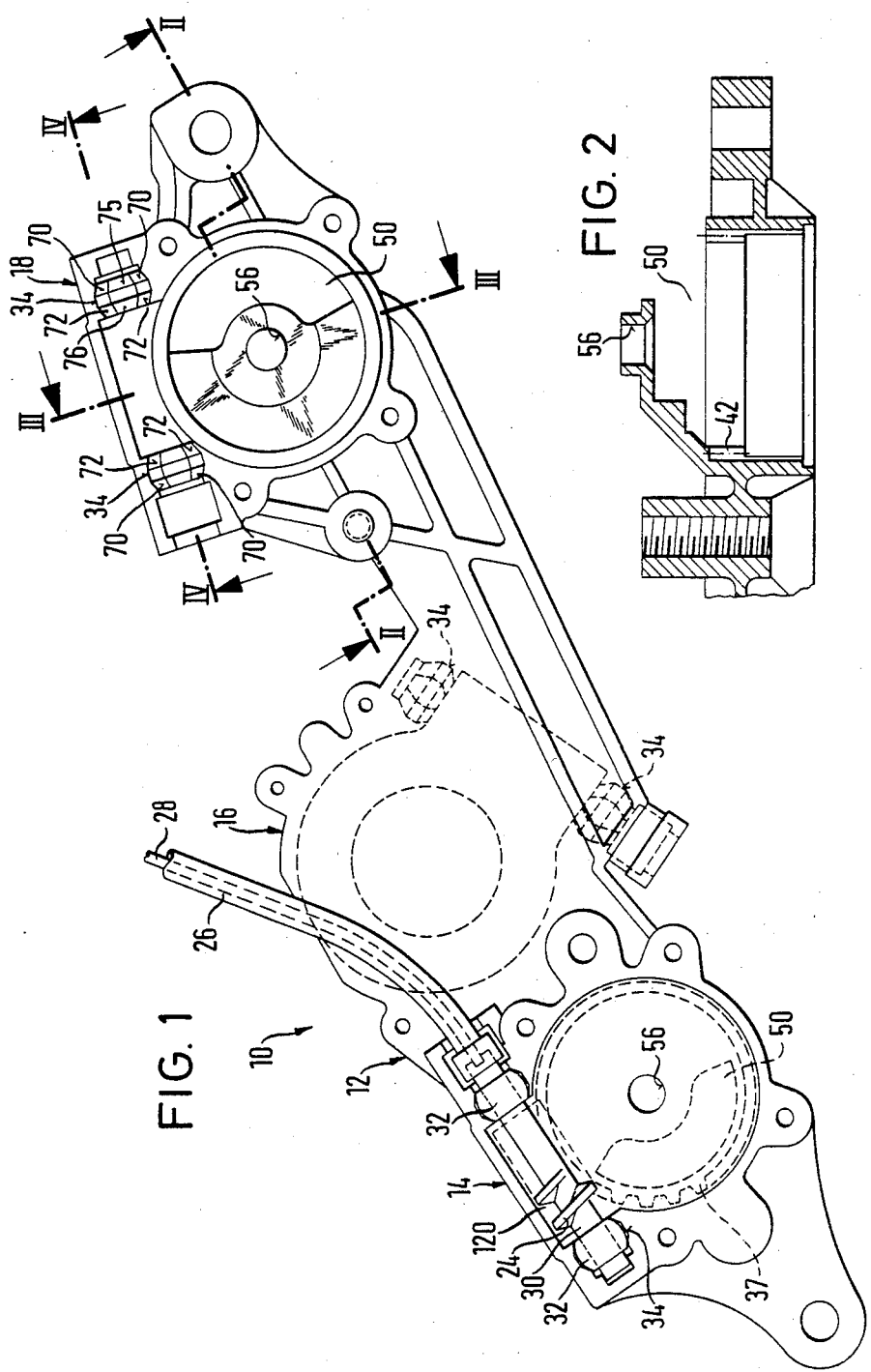

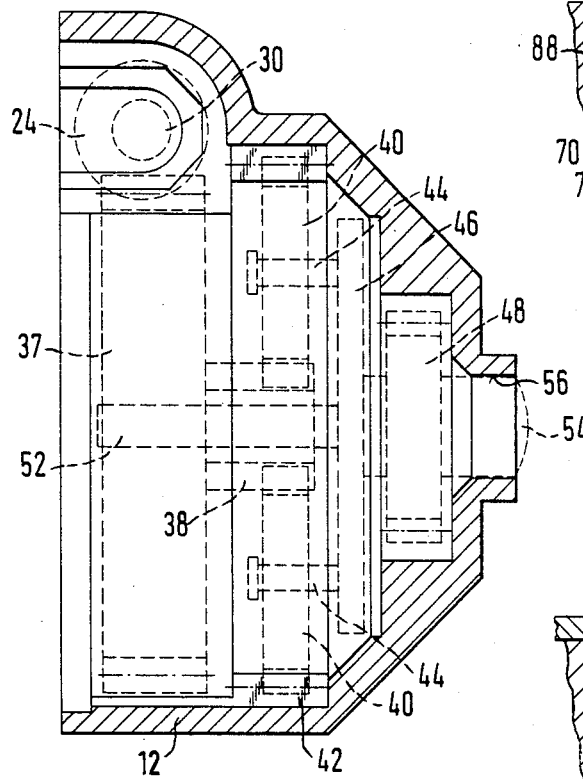
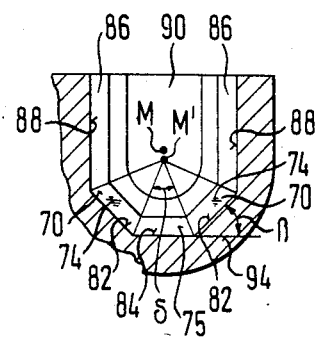
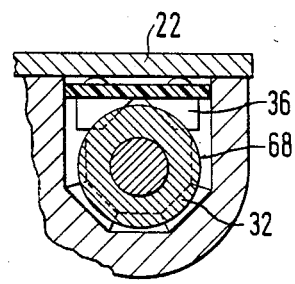
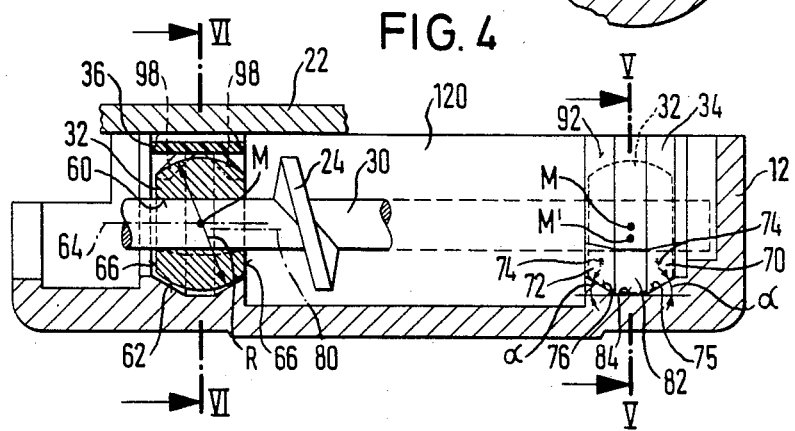

ADJUSTING TRANSMISSION IN A MOTOR VEHICLE

The present invention relates to an adjusting transmission in a motor vehicle, especially for a motor driven seat adjustment, with a transmission housing and a transmission element arranged at a bearing shaft, particularly a worm which is supported in the transmission housing in two bearing parts retaining the shaft.

In adjusting transmissions of motor vehicles, especially for the motorized seat adjustments, transmission elements are frequently supported on both sides, whereby this may involve transmission elements which by reason of their position and function are supported as a rule at both ends (for example, a worm which engages with a worm gear), or transmission elements exposed to particularly strong mechanical loads. A direct bearing support of the shaft on both sides in the transmission housing, for example, by inserting the shaft into precast bearing bores of the housing, cannot be used as a rule because the manufacturing tolerances which occur with the normal casting techniques, are excessive. However, a costly afterfinishing operation is to be avoided.

An adjusting transmission of the aforementioned type is described in U.S. Pat. No. 3,735,645. The two shaft bearing parts are formed by slotted bushings 78 and 80 in one piece with a plastic plate 70. After the insertion of the bearing shaft 54 into these bushings, the plate is mounted on the transmission housing 10 whereby the bushings are inserted into housing apertures 62 which abut areally at the outer circumference of the bushings in order to avoid thereby that the shaft slides out of the slotted bushings in the radial direction. Manufacturing inaccuracies of the housing apertures as well as of the shaft bearing parts, however, may also lead in this case to problems, especially a not completely accurate alignment of the two half-cylindrical housing apertures cannot be compensated by the known shaft bearing parts, which has as a consequence a hard-to-operate transmission and therewith a reduction of the transmission efficiency, and therebeyond an increased wear with the danger of premature destruction of the transmission.

In contradistinction thereto, it is the primary object of the present invention to provide an adjusting transmission of the aforementioned type which assures an operation low in friction and low in wear combined with simple manufacture.

The underlying problems are solved according to the present invention in that at least one of the two shaft bearing parts is supported in the associated housing aperture tiltable in at least one plane containing the bearing shaft axis. A self-centering of at least one of the two shaft bearing parts, best of both shaft bearing parts, is therefore achieved according to the present invention, whereby it suffices in some applications if this self-centering is attained with respect to one tilting plane, whereby the tilting plane is to be placed in such a manner that the angular errors which occur most frequently can be compensated thereby.

If, according to a further feature of the present invention, the mutual abutment surfaces of the shaft bearing part and/or of the coordinated housing aperture is essentially part of a spherical surface with a center point of the sphere located on the shaft axis, it is achieved in a simple manner from a manufacturing point of view that angular errors of alignment disposed random within the space can be compensated for reliably by a corresponding self-alignment.

In order to avoid the relatively high manufacturing accuracies which are required with a spherical bearing (spherical surfaces engaging one within the other), it is proposed according to a still further feature of the present invention to construct the abutment surfaces of the housing aperture, i.e., the abutment surfaces which are generally more difficult to machine, as surfaces inclined to the shaft axis, preferably as prismatic surfaces.

If, according to still a further feature of the present invention, the shaft bearing part is constructed essentially ring-shaped with an outwardly curved external circumferential surface forming one of the abutment surfaces, then the shaft bearing part can be readily manufactured and requires only little axial space.

The shaft bearing parts can be inserted into the housing apertures during the assembly, for example, in the axial direction. However, the casting costs for the transmission housing as well as the assembly costs can be reduced if the housing aperture is provided with an insert opening for the shaft bearing part which is open in a radial direction in relation to the shaft axis, and if a pressure member is provided within the area of the insert opening which abuts at the shaft bearing part preferably under prestress. It is achieved by such prestress that the shaft bearing part is supported in the housing aperture without play and without stresses so that a quiet low-wear operation results.

According to still further features of the present invention, the abutment surface of the pressure member may be a portion of a spherical surface or may be formed by surfaces inclined to the shaft axis.

In addition to the self-alignment, also an automatic axial fixing of the shaft bearing part is achieved if, according to another feature of the present invention, the shaft bearing part rests at abutment places distributed over the circumference on both sides of its longest outer circumferential line which is located in a radial plane with respect to the shaft axis, against at least three, preferably four, inclined surfaces of the housing aperture and possibly of the pressure member. This axial fixing is thereby essentially independent of manufacturing tolerances insofar as the pressure member abuts at the shaft bearing part under prestress.

A simplified mounting at and attachment of the pressure member to the transmission housing is realized according to the present invention if the pressure member is adapted to be inserted into the insert opening, and if the outer circumference of the pressure member essentially corresponds preferably to the insert opening cross section. A separate fastening of the pressure member at the transmission housing can be dispensed with if the pressure member is pressed against the shaft bearing part by a housing cover plate.

According to still another feature of the present invention, the pressure member is provided on its side facing the housing cover plate with at least one raised portion, at which abuts the housing cover plate. The raised portion or portions forms or form a defined abutment pressure point or points and can be varied in a simple manner from a manufacturing point of view in adaptation to different conditions. The raised portions may also contribute to producing the desired prestress, be it that they curve the housing cover plate slightly toward the outside with corresponding production of a return force, without any slight elastic deformation of the raised portions. This elastic deformation is facilitated if the pressure member is formed of plastic material. In this case, the raised portions can be so dimensioned that they deform plastically within a range beyond the mentioned elastic range in order to be able to compensate thereby also larger manufacturing dimensional deviations while maintaining a certain elastic prestress after the plastic deformation has taken place.

If the raised portions are formed by two bulge-like raised portions extending essentially parallelly to the shaft axis and symmetrically with respect thereto, then it is assured that the pressure member is pressed uniformly against the shaft bearing part combined with simple manufacture.

These and other objects, features and advantages of the present invention will become more apparent from the following description when taken in connection with the accompanying drawing which shows, for purposes of illustration only, one embodiment in accordance with the present invention, and wherein:

FIG. 1 is a side elevational view of a triple adjusting transmission of a motorized seat adjustment in accordance with the present invention;

FIG. 2 is a cross-sectional view taken along line II—II of FIG. 1;

FIG. 3 is a cross-sectional view taken along line III—III of FIG. 1;

FIG. 4 is a cross-sectional view taken along line IV—IV of FIG. 1;

FIG. 5 is a cross-sectional view taken along line V—V of FIG. 4;

FIG. 6 is a cross-sectional view taken along line VI—VI of FIG. 4;

Figure 7:
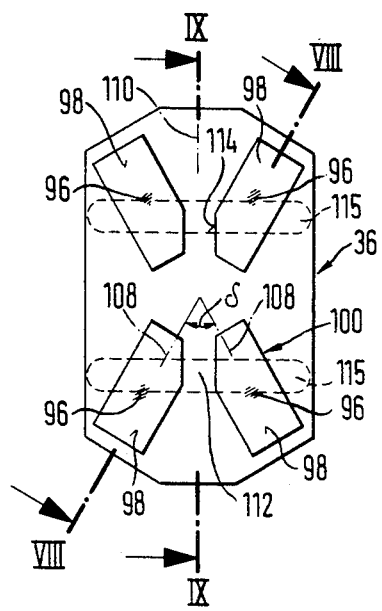
FIG. 7 is a plan view on a pressure member in accordance with the present invention to be inserted into the transmission housing according to FIG. 1.

Referring now to the drawing wherein like reference numerals are used throughout the various views to designate like parts, and more particularly to FIG. 1, the triple adjusting transmission generally designated by reference numeral 10 of a motorized seat adjustment, which is illustrated in this figure in simplified form, consists of a continuous transmission housing 12 which houses three adjusting transmission units generally designated by reference numerals 14, 16 and 18. In FIG. 1, only the first-mentioned transmission unit 14 with inserted transmission elements is illustrated and in FIG. 10 with screwed-on partially broken away housing cover plate 22 utilizing screws 20. The two further transmission units 16 and 18 have the same construction in principle but for the sake of simplification of the drawing are illustrated without transmission elements; in FIG. 3, these transmission elements are illustrated in dash lines; a worm 24 as essential part of the transmission units is illustrated in the left half of FIG. 4, and correspondingly in FIG. 6. According to FIG. 1, this worm 24 is driven by a flexible motor shaft 28 guided inside of a sleeve 26, whereby the motor shaft 28 starts from an electric motor (not shown). The worm shaft 30 projects on both sides beyond the worm body and is again supported on both sides of the worm 24 in shaft bearing rings 32 which are inserted into housing apertures 34 of the transmission housing 12 as will be described more fully hereinafter. Pressure members 36 to be also described more fully hereinafter by reference to FIGS. 6 to 10, are inserted into the housing apertures 32 and press against the respective bearing ring 32 if, according to FIG. 10, the housing cover plate 22 is installed.

As to the construction in principle of the respective transmission unit 14 to 18, reference is made to FIG. 3 which shows that the worm 24 engages in a worm gear 37. The worm gear 37 is rigidly connected with a sun gear 38 of reduced diameter which in turn meshes with planet gears 40. The planet gears 40 roll off along an internal circumferential toothed arrangement 42 of the housing 12 and are rotatably supported on axial projections 44 of a planet carrier 46. The planet carrier 46 is again rigidly connected with an output pinion 48 which extends out of the housing 12 through a housing opening 50, as can be seen in FIGS. 1 and 2. In the simplified illustration according to FIG. 3, the worm gear 37 together with the sun gear 38 is rotatably supported on an axial bearing projection 52 of the planet carrier 46. This bearing projection 52 can be supported in a housing cover in a conventional manner (not shown); the other end of this part, namely, a projection 54 projecting axially from the pinion 48 is rotatably supported in a bearing opening 56 of the housing 12 as can be seen in FIGS. 1 and 3.

The individual transmission units 14 to 18 serve for the realization of the different adjusting functions of the electric seat adjustment not illustrated as to the rest. As disclosed, for example, in the German Offenlegungsschrift No. 31 02 402, the transmission unit 14 serves for the lifting and lowering of the corresponding seat end, for example, of the forward seat end, for which a double-arm lever with a toothed sector (not shown) engages with the teeth of the output pinion 48. The output pinion 48 of the next transmission unit 16 may engage, for example, in a toothed rack for the horizontal adjustment of the seat and the pinion of the transmission unit 18 may engage in a toothed sector of a double-armed lever at the rear end of the seat for lifting, respectively, lowering this end. Worm gear transmissions of this type (with or without planetary gear speed reduction) with the self-aligning worm shaft bearing support on both sides, to be described more fully hereinafter, may also be used in other places and at other locations inside of the motor vehicle, for example, for the motorized adjustment of the inclination of the backrest or height adjustment of the headrest or inside of a motorized window lifter, especially of an arm window lifter.

The two bearing rings 32 assure a quiet low-wear operation of the shaft 30 retained by the same, essentially independently of manufacturing inaccuracies of the housing 12, especially of the housing apertures 34. The shaft 30 rotates with a sliding fit nearly free of play and frictionless in a corresponding continuous bearing bore 60 (FIG. 4) of the ring 32. The outer circumferential surface 62 of the ring 12 is part of a spherical surface whereby the center point M of the sphere lies on the axis of the bore 60 and therewith on the shaft axis 64. The two radial end surfaces 62 of the ring 32 radial with respect to the axis 64 have the same distance to the center point M. The ring 32 abuts at four prism surfaces on both sides of the longest outer circumferential line 68 located in the plane of the drawing in FIG. 6 and at a distance with respect to this line 68, whereby respectively two of these prism surfaces are part of the surface of the housing aperture 34 (FIGS. 1 and 4) and the other two of these prism surfaces form a part of the surface of the pressure member generally designated by reference numeral 36. In FIG. 1, the abutment prism surfaces more remote from the worm 24 are designated by reference numeral 70 and the abutment prism surfaces located more close to the worm 24 by reference numeral 72. Therebeyond, a possible contact area 74 between the outer circumferential surface 62 and the prism surfaces 70 and 72 is indicated in FIGS. 4 and 5 in crosshatching. A further prism surface 75, respectively, 76 is formed between the surface pairs 70, respectively, 72 and more particularly symmetrically to a symmetry axis 80 (FIG. 4) which extends parallel to the axis 64 and is offset slightly in the direction away from the housing cover plate 22. The axis 80 intersects the drawing plane in FIG. 5 in the point M', whereby the distance between the axes 64 and 80 is shown considerably increased in FIGS. 4 and 5 to better illustrate the present invention. The surface pairs 70 and 72, respectively, 75 and 76 which are disposed one behind the other in relation to the axis 64, are connected with each other by surfaces 82, respectively, 84 which extend parallel to the axis 64, respectively, 80. Further surfaces 86, respectively, 88 (FIG. 5) adjoin the surfaces 70, 72 and 82 in the direction toward the housing cover plate 22, which are disposed perpendicularly to the plane of the plate 22 and in this manner form an insert opening 90 for the ring 32. The surfaces 88 extend parallel to the axis 64 whereas in contrast thereto, the successive surfaces 86, 70, 75, 70 and 86 which follow one another, all subtend on one side of the point M, respectively, M' an angle $\alpha$ of about 30° with the axis 64, respectively, 80 as also the opposite surfaces 86, 72, 76, 72 and 86 (respectively, 330° with same angular direction). In the projection of FIG. 5, the straight lines placed through the break edges between adjacent prism surfaces 75 and 70, respectively, 70 and 86, pass through the point M' whereby adjacent straight lines subtend an angle $\delta$ of 45° with each other (FIG. 5). This angle corresponds also to the angle of inclination $\beta$ of the surface 82 with respect to a plane 94 parallel to the plane of the housing cover plate 22. The diameter R (FIG. 4) of the circumferential surface 62 of the ring 32 is now fixed in such a manner that the ring 32 contacts the aperture 34 exclusively at the indicated four contact places 74 inside of the surfaces 70 and 72. The normal to the respective prism surface 70, respectively, 72 in the corresponding contact point passes naturally through the center point M.

Figure 8:
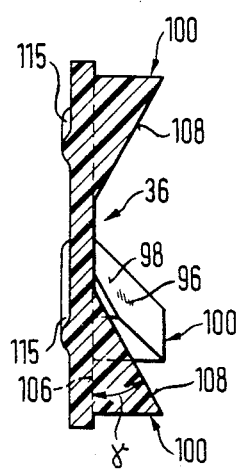
FIG. 8 is a cross-sectional view taken along line VIII—VIII of FIG. 7.
Figure 9:
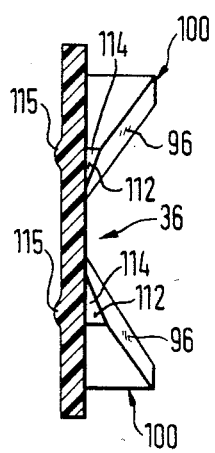
FIG. 9 is a cross-sectional view taken along line IX—IX of FIG. 7.

The pressure member 36 which presses at these abutment places in the ring 32, abuts as already mentioned, also at four abutment places 96 again indicated by crosshatching in FIGS. 7 to 9, which are disposed approximately diametrally opposite the pressure places 74 (in relation to the sphere center point M). The pressure places 96 are part of correspondingly inclined prism surfaces 98. These prism surfaces 98 are again formed by the inclined wedging surface of a respective wedgelike projection 100 at the bottom side opposite the housing cover plate of the otherwise plate-shaped pressure member 36 which is parallel to the pressure plate 22. The wedge angle $\gamma$ in FIG. 8 (i.e., the angle between the plane 106 of the plate-shaped pressure member 36 and that straight line 108 in the surface 98 with largest inclination to the plane 106 which lies in FIG. 8 in the plane of the drawing), amounts to about 30°. Two wedging projections 100 each lie symmetrically to a plane 110 radial with respect to the axis 64 by subtending an angle $\delta$ of 60° (angle between the projections of the straight lines 108 of the two wedging projections 100 in the plane of the drawing of FIG. 7). The two wedging projections 100 which are adjacent one another in this manner, would pass over one into the other with a complete construction thereof; however, they are separated from one another by a groove 112 rectangular in cross section (groove side surface 114 at the prism projections 100 parallel to the plane 110 according to FIG. 9).

Two bulge-like raised portions 115 (FIGS. 8 and 9) are formed integral on the top side of the pressure member 36 facing the plate 22, which extend parallel to the axis 64 and symmetrically with respect thereto.

Figure 10:
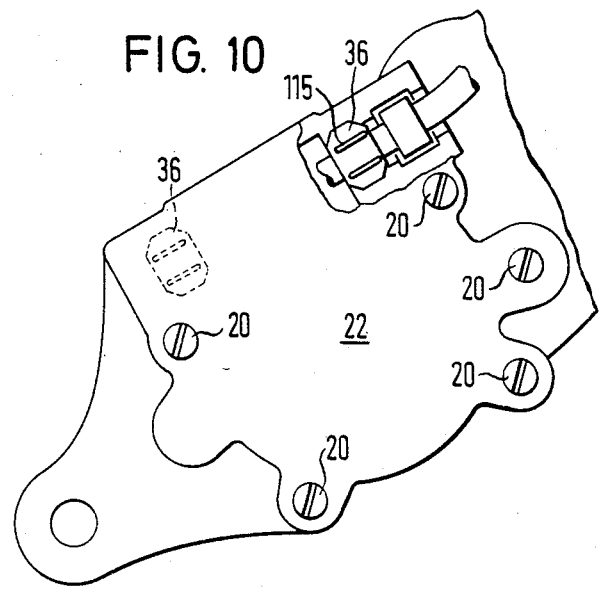
FIG. 10 is a view corresponding to FIG. 1 on the left end of the adjusting transmission with installed and partially broken away housing cover plate.

The contour of the essentially plate-shaped pressure member 36 is matched to the cross section of the insert opening 90 so that the pressure member 36 can be inserted according to FIGS. 4, 6, and 10 into the corresponding housing aperture 34.

During the assembly of the worm bearing, one may proceed in the following manner:

As a first step, one ring 32 each is slipped over the shaft 30 on both sides of the worm 24. The thus preassembled structural part is then lowered into a corresponding worm aperture 120 of the housing 12 with simultaneous insertion of the rings 32 into the provided housing apertures 34. Thereupon, one pressure member 36 is inserted into the insert opening 90 of each of the two housing apertures 34, with the wedge projections 100 leading, and subsequently the housing cover plate 20 is inserted and screwed fast by means of the screws 20. The plate 22 presses against the bulge-like raised portions 115 which deform more or less strongly elastically and possibly also plastically under the pressure. The wedging projections 100 press correspondingly strongly against the ring 32 which, as a result thereof, is pressed against the prism surfaces 70 and 72 of the housing aperture 34. The center point M of the sphere lies approximately in the symmetry plane 110 (see FIG. 7) of the inserted pressure member 36. Consequently, the desired clamping-in of the ring 32 between the eight prism surfaces 70, 72, 75 and 76 results which, by reason of their inclination, each with respect to the ball center point M, assure on the one hand, that the ring 32 assumes an equilibrium position secured against axial displacement and, on the other, permit a pivoting of the ring 32, free except for the friction forces, about any desired pivot axis passing through the center point M. Consequently, the two rings 32 on both sides of the worm 24 orient themselves automatically so that they are aligned. With a not-exactly straight shaft 30, the rings 32 follow the corresponding orientation change of the shaft 30 so that also under these circumstances a worm operation results which is easy, essentially play-free and therefore low in noise, independently of manufacturing inaccuracies of the housing 12, shaft 30, pressure member 36 and housing cover plate 22. The transmission can thus be run in easily.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An adjustable gear transmission in a motor vehicle comprising
a transmission housing; a transmission element on a rotating shaft which in turn is supported by two shaft bearing means, one located at one side of the transmission element, with the other located at another side of the transmission element; said transmission element, said rotating shaft and said two bearing means being inserted into an open recess in said housing; cover means cooperating with restraining surface means for closing said open recess and for securing said shaft bearing means in said recess; wherein at least one of said two shaft bearing means is essentially ring-shaped with an outer circumferential surface configured as part of a spherical surface; said one bearing means having a first portion of its outer circumferential surface contacting a support means in the recess and a second portion of its outer circumferential surface being pressed against the restraining surface means and wherein each of said support and restraining surface means being formed by at least three prismatic surfaces that are sloped toward the rotating axis of the shaft and armed toward the direction of the center of the spherical surface of said bearing means on two sides of a radial plane of the shaft bearing means extending through the center point of the spherical surface; and wherein the three prismatic surfaces of the support surface means are located on one side of a plane extending through the center point of the spherical surface and the axis of the shaft means and wherein the three prismatic surfaces of the restraining surface means being located on the other side of the plane extending through the center point and axis.

2. An adjustable gear transmission according to claim 1, wherein the restraining surface means is deformable to compensate for deviations in manufacturing tolerances of the transmission.

3. An adjustable gear transmission according to claim 1, wherein there are four prismatic surfaces for each of the support and restraining surface means.

4. An adjustable gear transmission according to claim 2, wherein there are four prismatic surfaces for each of the support and restraining surface means.

5. An adjustable gear transmission according to claim 1, wherein the second circumferential area is disposed within and essentially the same as the cross-sectional area defined by the open recess area that is closed by the cover.

6. An adjustable gear transmission according to claim 2, wherein the second circumferential area is disposed within and essentially the same as the cross-sectional area defined by the open recess area that is closed by the cover.

7. An adjustable gear transmission according to claim 3, wherein the second circumferential area is disposed within and essentially the same as the cross-sectional area defined by the open recess area that is closed by the cover.

8. An adjustable gear transmission according to claim 4, wherein the second circumferential area is disposed within and essentially the same as the cross-sectional area defined by the open recess area that is closed by the cover.

9. An adjustable gear transmission according to claim 1, wherein the restraining surface means is also provided with an elevation portion against which the cover means rests.

10. An adjustable gear transmission according to claim 2, wherein the restraining surface means is also provided with an elevation portion against which the cover means rests.

11. An adjustable gear transmission according to claim 3, wherein the restraining surface means is also provided with an elevation portion against which the cover means rests.

12. An adjustable gear transmission according to claim 4, wherein the restraining surface means is also provided with an elevation portion against which the cover means rests.

13. An adjustable gear transmission according to claim 5, wherein the restraining surface means is also provided with an elevation portion against which the cover means rests.

14. An adjustable gear transmission according to claim 6, wherein the restraining surface means is also provided with an elevation portion against which the cover means rests.

15. An adjustable gear transmission according to claim 7, wherein the restraining surface means is also provided with an elevation portion against which the cover means rests.

16. An adjustable gear transmission according to claim 8, wherein the restraining surface means is also provided with an elevation portion against which the cover means rests.

17. An adjustable gear transmission according to claim 1, wherein the restrain surface means is also provided with two elevation portions against which the cover rests, said elevation portions extending parallel to each other and to the shaft rotation axis while also being located symmetrically with respect to said rotation axis.

18. An adjustable gear transmission according to claim 2, wherein the restrain surface means is also provided with two elevation portions against which the cover rests, said elevation portions extending parallel to each other and to the shaft rotation axis while also being located symmetrically with respect to said rotation axis.

19. An adjustable gear transmission according to claim 3, wherein the restrain surface means is also provided with two elevation portions against which the cover rests, said elevation portions extending parallel to each other and to the shaft rotation axis while also being located symmetrically with respect to said rotation axis.

20. An adjustable gear transmission according to claim 4, wherein the restrain surface means is also provided with two elevation portions against which the cover rests, said elevation portions extending parallel to each other and to the shaft rotation axis while also being located symmetrically with respect to said rotation axis.

21. An adjustable gear transmission according to claim 5, wherein the restrain surface means is also provided with two elevation portions against which the cover rests, said elevation portions extending parallel to each other and to the shaft rotation axis while also being located symmetrically with respect to said rotation axis.

22. An adjustable gear transmission according to claim 6, wherein the restrain surface means is also provided with two elevation portions against which the cover rests, said elevation portions extending parallel to each other and to the shaft rotation axis while also being located symmetrically with respect to said rotation axis.

23. An adjustable gear transmission according to claim 7, wherein the restrain surface means is also provided with two elevation portions against which the cover rests, said elevation portions extending parallel to each other and to the shaft rotation axis while also being located symmetrically with respect to said rotation axis.

24. An adjustable gear transmission according to claim 8, wherein the restrain surface means is also provided with two elevation portions against which the cover rests, said elevation portions extending parallel to each other and to the shaft rotation axis while also being located symmetrically with respect to said rotation axis.

25. An adjustable gear transmission according to claim 1, wherein both bearing means are identically shaped supported and restrained and wherein both bearing means have identically shaped supporting and restraining surface means.

26. An adjustable gear transmission according to claim 2, wherein both bearing means are identically shaped supported and restrained and wherein both bearing means have identically shaped supporting and restraining surface means.

27. An adjustable gear transmission according to claim 3, wherein both bearing means are identically shaped supported and restrained and wherein both bearing means have identically shaped supporting and restraining surface means.

28. An adjustable gear transmission according to claim 1, wherein the restraining means is made from a plastic material.

29. An adjustable gear transmission according to claim 2, wherein the restraining means is made from a plastic material.

* * * * *